United States Patent Office 3,756,801
Patented Sept. 4, 1973

3,756,801
ENHANCED PLANT TISSUE PENETRATION
Robert J. Herschler, Camas, Wash., assignor to Crown Zellerbach Corporation, San Francisco, Calif.
No Drawing. Continuation-in-part of application Ser. No. 344,558, Feb. 13, 1964, which is a continuation-in-part of applications Ser. No. 67,493, Nov. 7, 1960, and Ser. No. 203,743, June 20, 1962, all now abandoned. This application Feb. 13, 1967, Ser. No. 615,377
Int. Cl. A01n 5/00, 9/100
U.S. Cl. 71—65
23 Claims

ABSTRACT OF THE DISCLOSURE

A method and compositions are described for enhancing penetration of plant-active agents into plants by applying the plant-active agent to the plant in a composition including an amount of dimethyl sulfoxide which may vary from as low as parts per million values up to 100% concentration, depending upon the type of plant and amount and route of application. The agents include insecticides, fungicides, virucides, antibiotics, nutrients, metal salts, plant growth regulators, odorants, colorants, herbicides and defoliating agents. Agricultural diluents and surfactants are preferably incorporated in the composition. Application may be by spray, drench, xylem injection, and bark paints.

---

CROSS-REFERENCES TO OTHER APPLICATIONS

This application is a continuation-in-part of copending application Ser. No. 344,558, filed Feb. 13, 1964, now abandoned which, in turn, is a continuation-in-part of copending applications Ser. No. 203,743, filed June 20, 1962 and Ser. No. 67,493 filed Nov. 7, 1960, both abandoned now.

DESCRIPTION OF THE INVENTION

This invention relates to a method and compositions whereby the penetration of plant-active agents into a living plant may be enhanced. More particularly, the invention relates to a method and compositions where plant-active agents are applied to plants along with dimethyl sulfoxide so that they may be penetrated into plant tissue which previously barred penetration or permitted penetration of the agents to a lesser degree.

As used herein and as understood by the art, the term "penetration" means take-up of any agent by the plant or incorporation into its tissue and, as used herein, it may be inclusive of diffusion of the agent throughout the plant.

Most plant-active agents, such as plant growth regulators, nutrients, some herbicides, insecticides, fungicides, virucides, antibiotics, defoliants and the like perform their function inside the plant and, therefore, are only effective to the extent that they can penetrate into plant tissue. Other pesticides, colorants, odorants, defoliants, etc. can be rendered more effective by penetration into plant tissue than they are when simply deposited on plant surfaces as they are normally used.

Plant-active agents are conventionally applied in dilute form in composition with various non-phytotoxic agricultural diluents or carriers, in most cases water. Where the plant-active agent is insoluble in the diluent, emulsifiers or dispersing agents are utilized to maintain the agent in a dispersed condition in diluent. Only a very few agents penetrate well into plant tissue even with such diluents or carriers and still fewer have the ability to move through the vascular system of the plant (translocate) once they are penerated. It has generally been accepted that the choice of diluent or carrier or of surfactant seldom increases the rate of penetration of a given agent since their role is merely to bring the agent into better distribution and intimate contact with the plant surfaces. Few (if any) substances are available which may be applied with the agent, in either concentrated or dispersed form, to materially increase penetration.

As a consequence, many plant-active agents, particularly pesticides, can only be applied to the outside of the plant to carry out their activity on the outer surfaces and they are, therefore, susceptible to removal and deactivation by rain, wind, sunlight, etc.

Agents which can only carry out their activity inside plant tissue often must be applied in uneconomic quantities or in expensive forms, (such as chelates) in order to achieve sufficient penetration into the plant. Many cannot be penetrated to any useful degree by most routes of application. It is, therefore, highly desirable to provide a method and compositions whereby such plant-active materials may penetrate plant tissue most effectively.

It is accordingly, a primary object of this invention to provide a method of enhancing penetration of plant-active materials into plants which previously barred penetration or permitted penetration only to a lesser degree.

It is another object to provide a method whereby penetration of plant-active agents may be enhanced utilizing formulations which may be easily administered by a variety of routes of application, including spray, xylem injection, bark paint, drenches, and the like and which often permit routes of application which have previously been ineffective.

It is another object to provide a method and compositions whereby an agent which has low phytotoxicity and low toxicity to animals is employed to enhance penetration of plant-active materials and whereby formulations with said agent may be prepared which are well tolerated by the plant.

These objects and still further objects and advantages will appear in the more detailed description set forth below.

It has been discovered that the penetration of a wide variety of plant-active agents may be enhanced in a unique manner when they are administered in combination with an effective amount of dimethyl sulfoxide. A composition containing the plant-active agent and dimethyl sulfoxide may be applied in a variety of ways to plant tissue and the plant-active agent therein will penetrate the tissue where previouly it could penetrate only to a lesser degree.

The mode of action by which dimethyl sulfoxide increases penetration is still not fully understood, particularly since there is no known precedent for this activity and because of the significant extent of the enhancement. However, it is notable that a more recent discovery by the present inventor has been that dimethyl sulfoxide also significantly enhances the penetration of many agents into animal tissue, including the skin, in a fashion not previously obtained with other materials. See, for example, the paper by A. Kligman in the American Medical Association Journal, entitled "Topical Pharmacology of Toxicology of Dimethyl Sulfoxide," vol. 193, Nos. 10 and 11, Sept. 6 and Sept. 13, 1965. Dimethyl sulfoxide has also recently been extensively studied for mammalian toxicity and the many reports indicate its toxicity to be roughly between that of ethanol and water. Absence of toxicity is highly important to the uses of dimethyl sulfoxide contemplated by the present invention.

Dimethyl sulfoxide has been known in the past as a solvent for certain organic and inorganic compounds. It is a colorless, watermiscible, highly polar liquid which melts at about 18.5° C. and boils at about 189° C. It may be prepared by different methods such as described in U.S.

Pats. 2,581,050; 2,935,533; and 2,702,824. It is supplied in commercial quantities by Crown Zellerbach Corporation, San Francisco, Calif.

Dimethyl sulfoxide may be used as a carrier or ingredient to be combined with the various plant-active agents. Such compositions may be diluted or combined with liquids such as water, alcohol or other organic solvents which may be accepted by the plant to provide lower concentrations of dimethyl sulfoxide and the agent. Also, as desired, wetting agents, surfactants, defoaming agents, emulsifiers and the like materials normally employed in application of plant-active agents in agriculture may be used in the compositions. Such customary use of emulsifiers and organic coupling solvents is of particular advantage where the plant-active agent has low water solubility.

Penetration of plant-active agents is enhanced when they are applied with varying amounts of dimethyl sulfoxide of high concentration, even 100% concentration. Smaller concentrations of dimethyl sulfoxide in formulations will improve plant tissue penetration, including translocation within the plant. Generally, improved penetration is obtained when dimethyl sulfoxide is present in formulations in substantially greater amounts than the plant-active agent. It has been found that close to 100% dimethyl sulfoxide in combinations with as little as 0.01% of a plant-active agent can provide excellent enhancement of penetration of the agent. For some routes of administration, such as stem treatments and fine mists, composition forms including at least 50% by weight dimethyl sulfoxide and even from about 80% to close to 100% may at times be utilized for some plants. However, as depicted in the examples that follow, lower concentrations of dimethyl sulfoxide by utilization of agricultural diluents are highly advantageous, particularly for economic considerations and for improved tolerance by the plant. For example, a 10% solution of dimethyl sulfoxide together with a plant-active agent may be used to drench a plant. Also lower concentrations of dimethyl sulfoxide may be used in aqueous spray compositions. Further information concerning selection of amounts and concentrations of dimethyl sulfoxide, plant-active agents, and of agricultural diluents and other adjuvants, such as surfactants, is provided by the examples and summary thereof which follows.

By the term "plant-active agent" is meant any agent which the practitioner desires to administer in order to obtain a physiological, plant protective (including therapeutic) or other desired and observable effect. Among the agents which exert a physiological effect are various plant nutrients (such as nutrient source, metal-containing compounds, phosphates and organic nitrogen compounds), plant growth regulators (such as plant hormones), herbicides and defoliating agents. Among agents which exert a plant protective effect are fungicides and pesticides such as insecticides (including thripicides and miticides), virucides, fungicides and bactericides (including antibiotics). Among the desired observable effects may be mentioned colorants (dyes) applied to plants for decorative reasons.

Illustrative of various plant-active agents are the following. (All trade names being capitalized):

Herbicides and plant growth regulators:
  acrolein
  3-amino-1,2,4-triazole
  dalapon
  2,4-dichlorophenoxy acetic acid
  diquat
  diuron
  Eptam (S-ethyl dipropylthiolcarbamate)
  indole acetic acid
  indole butyric acid
  maleic hydrazide
  norea
  monuron
  pentachlorophenol
  naphthalene acetic acid
  Randox (2-chloro-N,N-diallylacetamide)
  Simazine (2-chloro-4,6-bis(ethylamino)-S-triazine)
  Silvex (2(2,4,5-trichlorophenoxy)propionic acid)

Insecticides:
  aldrin
  allethrin
  benzene hexachloride
  dieldrin
  dimethoate
  dimite
  Dipterex (O,O-dimethyl 2,2,2-trichloro-1-hydroxyethyl phosphonate)
  endrin
  Guthion (O,O-dimethyl S-4-oxo-1,2,3-benzotriazin-3 4(H)-ylmethyl phosphorodithioate)
  Kalthane (1,1-bis (chlorophenyl)-2,2,2-trichloroethanol)
  methoxychlor
  Ovex (p-chlorophenyl-p-chlorobenzene sulfonate)
  piperonyl butoxide
  rotenone
  sabadilla
  Sevin (1-naphthyl N-methyl carbamate)
  Systox (a mixture of O,O-diethyl O-2-(ethylthio) ethyl phosphorothioate and O,O-diethyl S-2(ethylthio) ethyl phosphorothioate)
  Thimet (O,O-diethyl-S-(ethyl-thiomethyl) phosphorodithioate)
  pyrethrins
  Strobane (terpene polychlorinates (camphene, pinene and related terpene polychlorinates) with 65% chlorine value)
  toxaphene
  xanthone Fungicides, bactericides and virucides:
  Acti-dione (cycloheximide)
  captan
  chloranil
  cyano (methylmercuri) guanidine
  dichlone
  ethylmercuric chloride
  ethylmercuric phosphate
  ferbam
  glyodin
  griseofulvin
  hexachlorophene
  hydroxymercurinitrophenol
  Karathane (dinitro(1-methylheptyl)phenyl crotonate)
  maneb
  methyoxyethyl mercury acetate
  nabam
  pentachlorophenol
  Phaltan (n-trichloromethyl-thiophthalimide)
  streptomycin
  thiram
  oxytetracycline hydrochloride
  zineb
  ziram
  2-thiouracil
  6-mercaptopurine
  dodecyl dimethyl sulfonium methosulfate Plant nutrients:
  boron salts such as sodium borate
  calcium nitrate
  liquid fish concentrate (organic nitrogen source)
  potassium chloride
  urea
  phosphoric acid
  zinc nitrate
  ammonium nitrate
  ferric sulfate ferrous sulfate
ferric nitrate
iodine
cobalt salts
vanadium salts
iron chelates
zinc chelates
magnesium sulfate
molybdenum salt
ammonia
manganese sulfate
potassium sulfate
potassium phosphate
copper sulfate The following examples are presented to illustrate penetration enhancement of various plant-active agents, but it should be understood that such examples are not intended to represent exclusive embodiments.

EXAMPLE 1

Penetration of colorants

Five percent by weight solutions of soluble colorants in dimethyl sulfoxide were injected into the xylem of Western alder trees. The colorants used were Kiton Fast Red, Kiton Fast Blue, Kiton Fast Orange, Safranine, Pontamine Fast Scarlet, Sulfur Blue, Sulfur Red Brown and Benzidine Yellow. It was found that the colorants followed the vascular system of the tree by being moved along with the tree sap to the extremities. The effect of the colorants was observed 12 hours after the injection because of the color they imparted to the wood and leaves as they moved upward and downward through the tree.

In order to evaluate the effectiveness of water as a translocation aid, the procedure was repeated, except that water was used in lieu of dimethyl sulfoxide. There was no change of color of the wood (away from the injection site) or leaves of the tree after a period of 7 days.

EXAMPLE 2

Penetration of insecticides

Sitka spruce trees were treated by stem injection into the xylem with various insecticides to control a heavy infestation of the Sitka spruce weevil in the larvae form which was feeding on the cambium layer of the spruce trees terminal growth. The insecticides were dieldrin, lindane and methoxychlor. The insecticide solutions contained 25% by weight of the insecticide in 100% dimethyl sulfoxide. Treatment level was 0.25 gram of the active insecticide per inch of tree diameter. After 49 days, it was found that dieldrin, lindane, and methoxychlor, all normally non-translocatable, did control insect larvae with 100% kill of the spruce weevil in the Sitka spruce trees. In order to control the larvae, these insecticides had to move in the trees from a minimum of about 5 feet to a maximum of 12 feet in the sap flow of these trees.

EXAMPLE 3

Penetration of herbicides

Dimethyl sulfoxide was used as a translocation aid of a conventional herbicide, i.e. 2,4,5-trichlorophenoxy acetic acid. One-half gram of the herbicide in the form of a 10% solution in dimethyl sulfoxide was injected at one point only into the xylem of Western alder and Big Leaf maple trees. The response was quite rapid and it was quite evident from the effect on the foliage that pronounced herbicidal activity occurred. Approximately 7½ months after the treatment all of the trees were dead down to the roots.

EXAMPLE 4

Penetration of antibiotics

Five percent by weight of two antibiotics, Streptomycin and Bacitracin, in dimethyl sulfoxide were injected into the xylem of peach, pear, Douglas fir and Lombardy poplar trees. After approximately two weeks duration sap was expressed by pressing from representative branches of these various tree species. For the pear and peach trees there was some evidence of phytotoxicity where dimethyl sulfoxide solutions were used. However, the phytotoxicity was a transient condition partially attributed to the activities of the antibiotics. This sap was evaluated as a control agent against a yeast, *Saccaromyces cerevisiae*, grown on agar culture. It was found that the yeast was killed rapidly.

EXAMPLE 5

Penetration of plant drugs

Dimethyl sulfoxide solutions of thujaplicins extracted from *Thuja plicata* (Western red cedar) were injected into small Douglas fir seedlings, all from one seed source. Thujaplicins is a substance which helps the Western red cedar to resist rot. The concentration of chemical injected was 0.5 ml. of a 10% solution of the thujaplicins in 100% dimethyl sulfoxide. After seven days, the trees in the test were removed from the bed and both root and top growth were washed free of soil. The trees were divided into two sections, the root section below the injection site and the top growth from two inches above the injection site. Both the root section and the top growth section were individually pressed of their contained liquid, which was captured. This liquid was treated with a dilute solution of ferrous chloride which forms a strong color complex with thujaplicins. It was found that the thujaplicins introduced into the trees as a dimethyl sulfoxide solution had moved to the top growth since a strong ferrous chloride color reaction was obtained.

In order to evaluate the effectiveness of alcohol as a translocation aid, the procedure was repeated, except that alcohol was used in lieu of dimethyl sulfoxide. There was an extremely weak color response which can be termed negative.

EXAMPLE 6

Penetration of insecticides or miticides

Dimethyl sulfoxide solutions containing 5% by weight of insecticide or miticide were injected into peach and pear trees infected by mites. The chemicals employed were dieldrin, Dilan (a mixture of 2-nitro-1,1-bis (p-chlorophenyl) propane and 2-nitro-1-1-bis (p-chlorophenyl) butane), lindane, Guthion (O,O-dimethyl S-4-oxo-1,2,3-benzotriazin-3 (4H)-ylmethyl phosphorodithioate), Thiodan (6,7,8,9,10,10-hexachloro - 1,5,5a,6,9,9a - hexahydro-6,9-methano-2,4,3-benzodioxathiepin-3-oxide), DDT and Trithion (O,O-diethyl-S-p-chlorophenyl thiomethyl phosphorodithioate) which are known to be non-systemic when used alone. It was found that within one week after the trees had been injected with these solutions just above the graft, a very high kill of the two-spotted mites occurred. In most cases the kill was almost 100%. This indicates a very high efficiency of dimethyl sulfoxide as a mobilizer of organic pesticides which normally have no ability at all to move within the plant tissues.

EXAMPLE 7

Penetration of miticides

Lombardy poplar, peach and apple trees heavily infected with two-spotted mites were sprayed with various miticides which were diluted with a 10% by weight solution of dimethyl sulfoxide in water. Treatment levels in all cases were at two pounds miticides per acre. The volume of spray was at the level of 200 gallons per acre which purposely did not provide sufficient liquid for run-off wetting of leaves. The miticides applied were Guthion, Kelthane and Trithion. All trees were examined after 7 days, there was no build up of mite numbers in the trees treated with the dimethyl sulfoxide solution. Eighteen days after spraying, the trees treated with the dimethyl sulfoxide solution had uniformly very low populations of mites.

In order to evaluate the effectiveness of water as a penetration aid, the procedure was repeated, except that water was used in lieu of dimethyl sulfoxide solution. After seven days, the mite numbers had increased greatly in the trees.

EXAMPLE 8

Penetration of insecticides after stem application

Ten percent by weight solutions of insecticides Sevin, lindane and methoxychlor were prepared in 100% dimethyl sulfoxide. There were applied as paints to the bark of cherry and filbert trees. The cherries were infected with the pear slug and the filberts with the filbert aphid. Fourteen days after the application, 80% kill of pear slug was obtained with dimethyl sulfoxide solutions of Sevin (1-naphthyl N - methyl carbamate), lindane and methoxychlor. The population of filbert aphid was substantially reduced 40% with Sevin and methoxychlor and 55% with lindane.

In order to evaluate effectiveness of ethanol as a translocation aid, the procedure was repeated, except that ethanol was used in lieu of the dimethyl sulfoxide. There was no population reduction of either pest on the trees.

EXAMPLE 9

Herbicide compositions

| | |
|---|---|
| 3-amino 1,2,4-triazole | 100 |
| Dimethyl sulfoxide | 100 |

The herbicide, 3-amino 1,2,4-triazole was combined with dimethyl sulfoxide by mixing for a time sufficient to produce a solution. The resulting composition is suitable upon dilution with water, for use as a herbicidal spray.

EXAMPLE 10

Penetration of virucides

Plants of curcubits were artificially infected with tobacco mosaic virus and then treated with a control solution of different virus inhibitors dissolved in 100% ethanol and with a test solution of the same virus inhibitors in the same amounts dissolved in 100% dimethyl sulfoxide. In each case, the chemical inhibitor was present in the solution at 5% by weight of the solvent. The chemotherapeutic virus inhibitors employed were 2-thiouracil; 6-mercaptopurine; and dodecyl dimethyl sulfonium methosulfate. Each solution was applied in the fine mist to the foliage of the plant, while on a rotating table, with an estimated application of approximately 40 lb. of solution per acre. Both the control and test solutions initially caused a diminution in virus symptoms. After one week, the plants treated with the control solutions regressed while the plants treated with the test solutions containing dimethyl sulfoxide continued symptomatic relief even when last examined three weeks after application.

EXAMPLE 11

Penetration of metals and antibiotics

Some metal salts are known to control pest problems, i.e. fungal, bacterial or viral infections. Penetration of such salts, into the plant tissue is a problem. The following three basic formulations were used to prepare a number of compositions.

(1)

| | | |
|---|---|---|
| Antibiotic | grams | 0.2 |
| Dimethyl sulfoxide | ml | 10 |
| Water q.s. 100 ml. | | |
| Triton X–100 | ml | 0.1 |

(2)

| | | |
|---|---|---|
| Metal salts | grams | 2 |
| Dimethyl sulfoxide | ml | 10 |
| Water q.s. 100 ml. | | |
| Triton X–100 | ml | 0.1 |

(3)

| | | |
|---|---|---|
| Antibiotic | grams | 0.2 |
| Metal salts | do | 2 |
| Dimethyl sulfoxide | ml | 10 |
| Water q.s. 100 ml. | | |
| Triton X–100 | ml | 0.1 |

Different antibiotics used in formulations 1 and 3 were griseofulvin, sulfadimethoxine (Madribon), streptomycin and E–275 salicylate (Lilly (stendomycin salicylate)). The metal salts used in formulations 2 and 3 were ferric chloride and zinc sulfate. Each 100 ml. composition was applied as a spray to rows of mixed hybrid roses infected with powdery mildew and blackspot. Replicate applications were made to test each composition. Formulations 1 and 2 had measurable control of the disease symptoms, and outstanding control was obtained by compositions of formulation 3. In formulation 3, the composition containing ferric chloride and E–275 salicylate gave complete disease control which required reapplication only on a semimonthly basis.

EXAMPLE 12

Penetration of fungicides into non-dormant plant parts (tubers and corms)

The basic formulation was made as follows:

| | | |
|---|---|---|
| Water | gallons | 75 |
| Dimethyl sulfoxide | do | 2 |
| Fungicide | lb | 1 |

The compositions were made with each one of the following fungicides in the basic formulation:

(1) captan
(2) Dithane M–22 (manganese salt of ethylene bisthiocarbamates)
(3) Semesan (hydroxymercurichlorophenol)
(4) zineb Compositions of these solutions were used to treat dahlia and potato tubers and gladiola corms which were then planted in cable heated greenhouse beds using soil containing high concentrations of pathogenic organisms. As a control, one half of each bed was planted with the same crop treated exactly the same way except that dimethyl sulfoxide was omitted.

The dimethyl sulfoxide-fungicide treated tubers and corms sprouted and emerged faster and in significantly higher numbers.

EXAMPLE 13

Penetration of plant nutrients

Plantings of zinnia, marigold, bean, corn and cucumber were made in three natural soil types:

(1) high humus soil
(2) sandy loam
(3) river sand

Replicated flats were watered with distilled water containing 0, 1, 5 and 10 p.p.m. of dimethyl sulfoxide. Each test received the same volume of water fed by bottom irrigation once a week for six weeks. No fertilizers were added.

All of the plants and flats receiving dimethyl sulfoxide in the water showed a growth response and since the soil was not sterilized, the few weeds present also showed a growth response. The optimum level of dimethyl sulfoxide in this greenhouse testing was 5 p.p.m. At the end of six weeks, the plants from these flats average more height and top growth weight. It is believed that dimethyl sulfoxide enhanced root assimilation of nutrients to induce faster growth.

EXAMPLE 14

Tree paint composition

Five percent pentachlorophenol solutions were prepared in two solvent bases:

(1) 50/50 w./w. ethyl alcohol/glycerin
(2) 50/50 w./w. dimethyl sulfoxide/glycerin The ethanol and dimethyl sulfoxide were at 100% concentration. These paints were used to paint the canker infections of commercial peach trees suffering from the Cytospora fungus. In all cases the infection had proceeded 4–6 inches from the initial injury and infection site. Evaluation was made 12 months after the application. Both paints arrested the infection temporarily, but only the dimethyl sulfoxide and glycerin paint gave absolute control of the infection. Where solution 1 was used, cankers were observed spreading from the treated site.

A thickener such as bentonite may be added to the paint to conveniently treat the foregoing conditions as well as other injury and infection situations in trees. Addition of 2–3% of the bentonite thickner thickens the solution to a desired degree.

EXAMPLE 15

Penetration of plant growth regulators

Duplicate Douglas fir trees of 12–14 feet in height were treated by xylem injection near the ground line with the following:

(1) 20 ml. dimethyl sulfoxide/acetone 50/50 by volume containing no additive.
(2) 20 ml. dimethyl sulfoxide/acetone 50/50 by volume containing 0.5 g. indole acetic acid.
(3) 20 ml. dimethyl sulfoxide/acetone 50/50 by volume containing 0.5 g. indole butyric acid.
(4) 20 ml. dimethyl sulfoxide/acetone 50/50 by volume containing 0.5 g. naphthalene acetic acid.

In 37 days selected limbs near the tops were harvested and 1 year wood cuttings taken. These were planted in moist sand with bottom heat at 65° F. Plantings were in a growth chamber maintaining nearly 100% relative humidity.

In three weeks thirty cuttings of each above test situation were lifted and examined for callous or root development. None showed evidence of primary root development. Callous, which often precedes root production, was in good evidence, however. The cuttings above had the following numbers of callous formations:

(1) 7 of 30
(2) 21 of 30
(3) 23 of 30
(4) 30 of 30

Such hormones have not been shown to be translocated in plants. The dimethyl sulfoxide carried the root inducing hormones at least several feet into the new tip wood used as cutting stock, and thereby greatly improved the callous development. Such a procedure should alter and make easier the cutting propagation of plants of all kinds.

EXAMPLE 16

Penetration of dyes in flower blossoms

Stems of cut carnations were dipped in separate aqueous solutions of three food colors: red, yellow and green. The dye concentration was 1 gm./1000 ml. In one series, no dimethyl sulfoxide was used, in a second series 5 ml. of dimethyl sulfoxide was used per 1000 ml. of dye solution. The systems with dimethyl sulfoxide picked up and transported the dyes more rapidly, and stronger blossom colors were achieved.

EXAMPLE 17

Penetration of micronutrients

Iron deficient chlorotic roses and soya beans were sprayed with two solutions containing equal concentrations of ferric iron. Spraying was done to avoid all control except with leaves and stems. In each case, spraying was sufficiently performed so liquid could run off. The sprays contained:

(1) 2 grams $Fe_2(SO_4)_3$, 100 grams $H_2O$
(2) 2 grams $Fe_2(SO_4)_3$, 98 grams $H_2O$, 2 grams 100% dimethyl sulfoxide Spray two within one week after application relieved chlorosis symptoms. Spray one had little or no value.

EXAMPLE 18

Foliar spray

Karothane (dinitro(1methylheptyl)phenyl crotonate), a commercial fungicide, was made up at a level of 2 lbs./100 gallons of water. In one composition, 100% dimethyl sulfoxide was added at a level of 2 gal./100 gallons of water. In a second or control composition there was no dimethyl sulfoxide.

Different rows of Jonathan apples, heavily infected with powdery mildew, were sprayed with one or the other composition. Both compositions temporarily arrested the infection. However, without dimethyl sulfoxide control was obtained for only two weeks. With dimethyl sulfoxide, control was extended to three weeks.

To summarize, Examples 1 to 6, 10 and 15 illustrate the use of formulations containing over 50% by weight dimethyl sulfoxide for xylem injection, bark paint and fine mist application. Examples 7, 11, 13, 16, 17 and 18 illustrate that for drenches or for heavy foliage sprays, lower concentrations of dimethyl sulfoxide of 2% or ½% and below, even down as low as 5 to 10 parts per million, are preferable and avoid undue phytotoxicity. As for the type and size of plant involved, Examples 2, 4, 5 and 15 illustrate that concentrations of dimethyl sulfoxide as high as 97.5% are tolerated conifers by certain routes of application (to the stem). Examples 1, 4, 6, 8 and 14 show that relatively high concentrations may be employed by some modes of application (bark, paint, and injection) to tough deciduous plants, although lesser concentrations for spray application are shown by Example 7 (10%) and Example 18 (2%) to be preferred. For tender deciduous plants, and for tender herbaceous plants, lower concentrations are illustrated by Examples 11, 13, 16 and 18 to be preferred. Even lower concentrations of dimethyl sulfoxide for drench and other heavy applications are illustrated in Example 13 (5 and 10 parts per million) and Example 16 (0.5%). However, Example 10 illustrates that higher concentrations of dimethyl sulfoxide may be tolerated by some tender plants when it is applied in limited amounts as a fine mist.

The example show that the plant-active agent may be applied to a wide range of concentrations and amounts. This will obviously depend on the particular agent involved and the amount thereof required for effective treatment.

In Example 2, the insecticides are applied in a concentration of 25% by weight in stem injection. In the majority of the examples the active agent is present in the formulation in amounts from 1% to 10%. The antibiotics of Example 11 and the dyes of Example 16 are formulated at less than 0.2% and 0.1% respectively.

The guide lines provided in the examples will assist in determining effective amounts for practice of the invention. As used in the specification and claims the term "effective amount" of dimethyl sulfoxide is intended to mean an amount which is effective to enhance penetration of the plant-active agent in a useful manner. Where phytotoxicity may result, the term "effective amount" is intended to exclude unduly phytotoxic amounts which prevent effective application of the agent. In this regard, as shown in Example 4, some degree of phytotoxicity may be tolerated and may be consistent with useful and effective results. In the same manner, as applied to the plant-active agent, the term "effective amount" is intended to mean an amount which will usefully carry out its activity for the plant involved.

A new method of enhancing penetration of plant-active agents has been provided by this invention whereby more effective results may be obtained. Often new modes of administration may be employed which previously were not effective. Materials which previously could not penetrate into plants can be caused to penetrate effectively and often to translocate throughout the plant.

This invenion can now be practiced by those skilled in the art. Such skilled persons will know that the invention is not necessarily restricted to the particular embodiments presented herein. The scope of the invention is to be defined by the terms of the following claims as given meaning by the preceding description.

What I claim is:

1. A method of enhancing penetration of a plant-active agent into the living tissue of a living rooted plant, said agent being capable of effecting a physiological response within the plant, which comprises contacting the plant with a liquid composition comprising an amount of said agent effective to obtain a physiological response by said plant and dimethyl sulfoxide in an amount effective to enhance penetration of said agent into the living tissue of said plant, the concentration of dimethyl sulfoxide in said composition being at a substantially non-phytotoxic level for the selected amount and route of application of said composition to the plant.

2. A method as in claim 1 and wherein said agent is a plant nutrient assimilable by said plant.

3. A method as in claim 1 and wherein said plant is a tree and wherein said composition is administered to the stem thereof by xylem injection.

4. A method as in claim 1 and wherein said plant is a tree and wherein said composition is administered to the stem thereof as a bark paint.

5. A method of enhancing penetration of a plant protective pesticide, active against pest organisms which attack plants, into the living tissue of a living rooted plant subject to attack by such pests, which comprises contacting the plant with a liquid composition comprising an effective amount of said pesticide and dimethyl sulfoxide in an amount effective to enhance penetration of said pesticide into the living tissue of said plant, the concentration of dimethyl sulfoxide in said composition being at a substantially non-phytotoxic level for the selected amount and route of application of said composition to the plant.

6. A method as in claim 5 and wherein said pesticide is selected from the group consisting of fungicides, bactericides, virucides and insecticides.

7. A method as in claim 5 and wherein said composition is aqueous and comprises an effective amount of said pesticide, a major amount of water, a surfactant and dimethyl sulfoxide in an amount up to 10% by weight of said composition, and wherein said aqueous composition is administered to said plant by spray application to aerial portions thereof.

8. A method as in claim 7 and wherein said surfactant is non-ionic.

9. A method as in claim 7 and wherein said composition comprises a synergistic combination of an antibiotic and a pesticidal metal salt selected from the group consisting of zinc salts and iron salts.

10. A method as in claim 5 and wherein said plant is a tree and wherein said composition is administered to the stem thereof by xylem injection.

11. A method as in claim 5 and wherein said plant is a tree and wherein said composition is administered to the stem thereof as a bark paint.

12. A method of enhancing penetration of a plant growth regulating agent into the living tissue of a living rooted plant which comprises contacting the plant with a composition comprising an effective amount of said agent and dimethyl sulfoxide in an amount effective to enhance penetration of said agent into the living tissue of said plant, the concentration of dimethyl sulfoxide in said composition being at a substantially nonphytotoxic level for the selected amount and route of application of said composition to the plant.

13. A method as in claim 12 and wherein said agent is a plant hormone.

14. A method as in claim 12 and wherein said composition is aqueous and comprises an effective amount of said agent, a major amount of water, a surfactant and dimethyl sulfoxide in an amount up to 10% by weight of said composition, and wherein said aqueous composition is administered to said plant by spray application to aerial portions thereof.

15. A method of enhancing penetration of a plant nutrient selected from the group consisting of nutrient source metal salt-containing compounds, phosphorous source compounds, ammonia salts and organic nitrogen compounds, into the living tissue of a living rooted plant which comprises contacting the plant with a composition comprising an effective amount of said nutrient, and dimethyl sulfoxide in an amount effective to enhance penetration of said nutrient into said plant, the concentration of dimethyl sulfoxide in said composition being at a substantially non-phytotoxic level for the selected amount and route of application of said composition to the plant.

16. A method as in claim 15 and wherein said composition is aqueous and comprises an effective amount of a nutrient source metal-containing compound, a major amount of water, a surfactant and dimethyl sulfoxide in an amount up to 10% by weight of said composition, and wherein said aqueous composition is administered to said plant by spray application to aerial portions thereof.

17. A method as in claim 16 and wherein said metal-containing compound is selected from iron compounds and zinc compounds.

18. A method of enhancing penetration of a colorant into plant tissue which comprises contacting the plant tissue with a composition comprising said colorant in an amount effective to color said tissue and dimethyl sulfoxide in an amount effective to enhance penetration of said colorant into said tissue.

19. A method as in claim 18 and wherein said composition is aqueous and comprises an effective amount of a dye, a major amount of water and dimethyl sulfoxide in an amount up to 10% by weight of said composition.

20. A method of enhancing penetration of a herbicide into the living tissue of a living rooted plant which comprises contacting the plant with a composition comprising an effective amount of a herbicide and dimethyl sulfoxide in an amount effective to enhance penetration of said herbicide into the living tissue of said plant.

21. A method as in claim 20 and wherein said composition is aqueous and comprises an effective amount of herbicide, a major amount of water, a surfactant and dimethyl sulfoxide in an amount up to 10% by weight of said composition and wherein said composition is administered by spray application to aerial portions of said plant 22. A method of enhancing penetration of a plant protective pesticide, active against pest organisms which attack plant tissue, said pesticide being selected from the group of fungicides, insecticides and bactericides, into the living tissues of a non-dormant plant part, which comprises contacting the living tissue of said plant part with a liquid composition comprising an effective amount of said agent, a major amount of an agricultural diluent and an amount of dimethyl sulfoxide effective to enhance penetration of said pesticide into the living tissue of said plant part, the concentration of dimethyl sulfoxide in said composition being at a non-phytotoxic level for the amount and route of application of said composition to said plant part.

23. A method of enhancing penetration of a plant growth regulator into the living tissue of a non-dormant plant part which comprises contacting the living tissue of said plant part with a composition comprising an effective amount of a plant growth regulator, a major amount of an agricultural diluent and an amount of dimethyl sulfoxide effective to enhance penetration of said plant growth regulator into the living tissue of said plant part, the concentration of dimethyl sulfoxide in said composition being at a non-phytotoxic level for the amount and route of application of said composition to said plant part.

References Cited

UNITED STATES PATENTS 3,321,364  5/1967  Kessler _____ 167—24

FOREIGN PATENTS 810,377  3/1959  Great Britain __ 167—82 DMSO

JAMES O. THOMAS, JR., Primary Examiner

U.S. Cl. X.R.

40—58; 71—70, 77, 128d; 424—127